Nov. 23, 1965  G. M. PALMER  3,219,019
INTERNAL COMBUSTION ENGINE VALVE GEAR
Filed Aug. 14, 1963  2 Sheets-Sheet 2
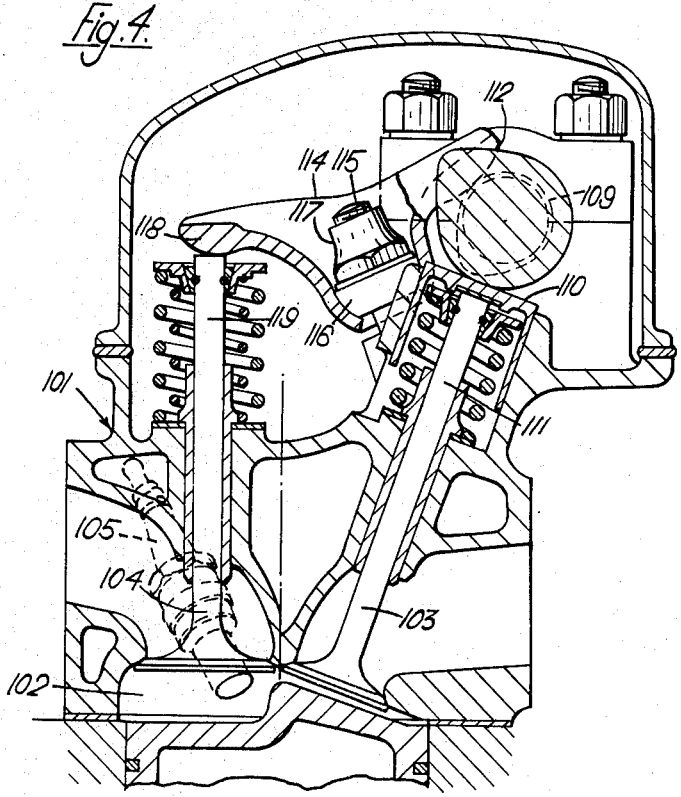
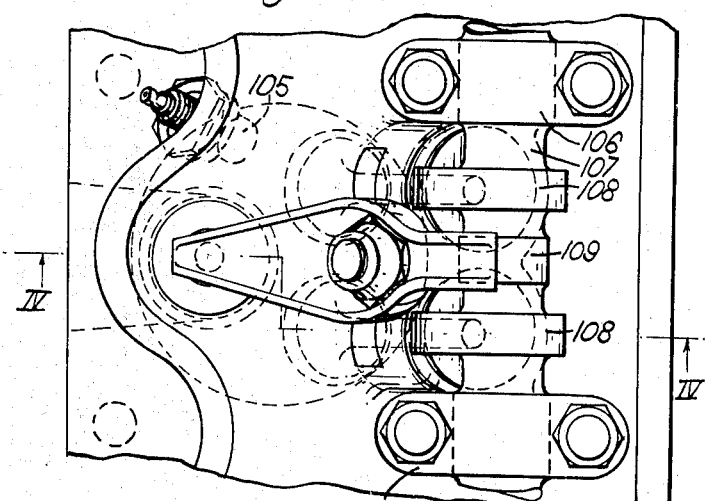
Inventor
Gerald Marley Palmer
BY
E. W. Christon
Attorney United States Patent Office 3,219,019
Patented Nov. 23, 1965

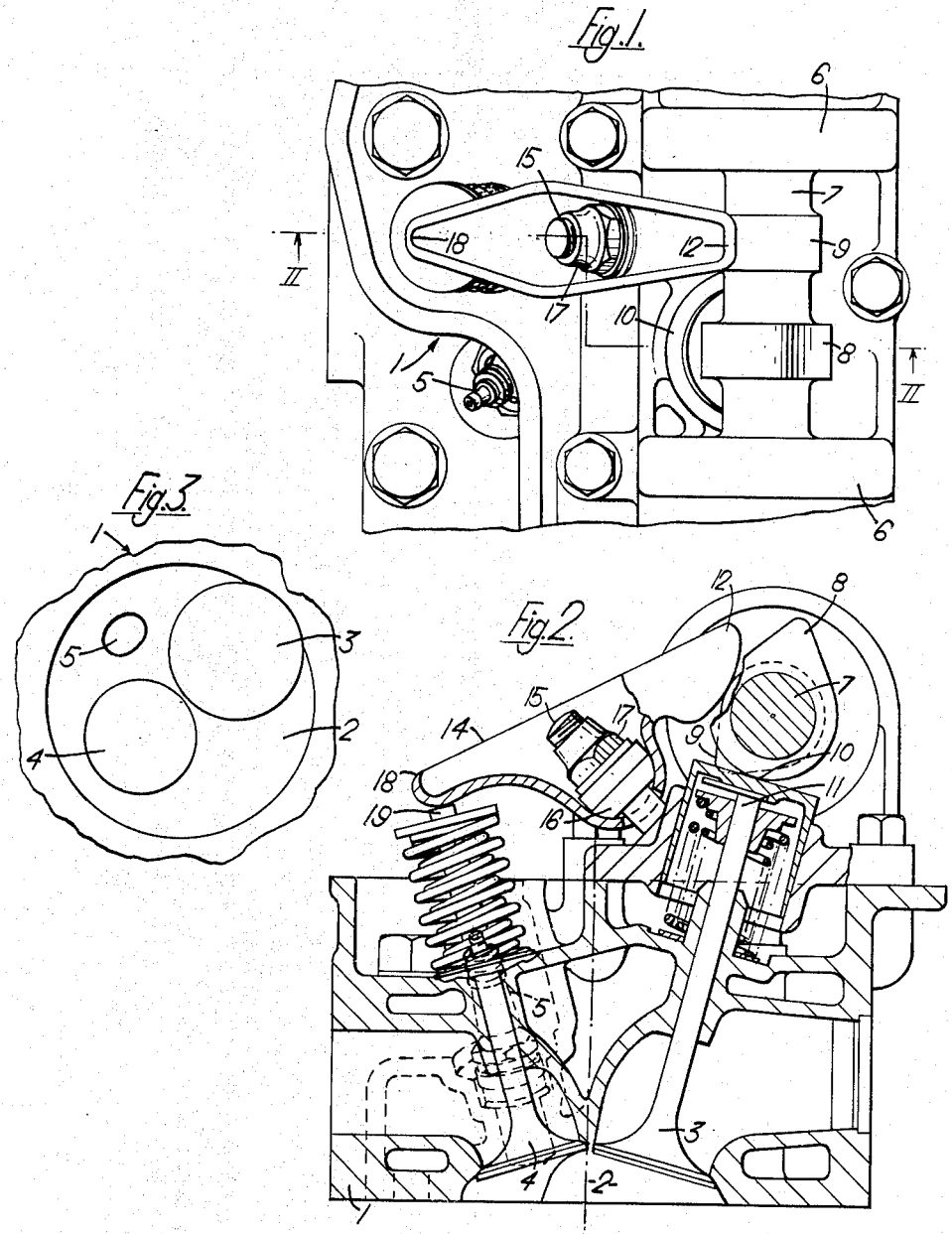

3,219,019
INTERNAL COMBUSTION ENGINE VALVE GEAR
Gerald Marley Palmer, Iffley, Oxford, England, assignor to General Motors Corporation, a corporation of Delaware
Filed Aug. 14, 1963, Ser. No. 302,088
Claims priority, application Great Britain, Aug. 23, 1962, 32,423/62
3 Claims. (Cl. 123—90)

This invention relates to internal combustion engine valve gear and in particular to valve gear incorporating an overhead camshaft.

In an internal combustion engine valve gear according to the invention the engine inlet and exhaust valves are respectively operated directly, and indirectly through a rocker lever, by a single camshaft.

The camshaft is preferably located directly over the inlet valves of the engine and the exhaust valves are actuated by rocker levers, opposite ends of a rocker lever respectively engaging a cam surface on the camshaft and an end of the exhaust valve.

Preferably the inlet and exhaust valves respectively extend on opposite sides of, and at an angle to, a vertical plane which extends through the cylinders; and the rocker lever is preferably mounted on a stud or like support the axis of which is at an angle to the vertical so that the forces exerted on the stud during actuation of the rocker lever are substantially parallel to its axis.

The rocker lever is preferably of pressed sheet metal construction and is mounted on a part spherical pivot member the axial position of which on the stud is adjustable, as by a lock-nut or the like, to permit adjustment of the valve clearances.

The scope of the invention is defined by the appended claims; and the invention and the method by which it is to be performed are hereinafter particularly described with reference to the accompanying drawings in which:

FIGURE 1 is a plan of part of an internal combustion engine cylinder head with a valve gear according to the invention;

FIGURE 2 is a section on the line 2—2 of FIGURE 1;

FIGURE 3 is a view of the combustion chamber shown in FIGURE 2, as seen from below;

FIGURE 4 is a section, on line 4—4 of FIGURE 5, of a second embodiment of the invention; and FIGURE 5 is a plan of FIGURE 4.

The drawings show part of an internal combustion engine cylinder head 1 having therein a combustion chamber 2 in which is an inlet valve 3, an exhaust valve 4 and a spark plug 5. The combustion chamber is of substantially part-spherical shape and the inlet and exhaust valves 3, 4 respectively extend on opposite sides of, and at an angle to, a vertical plane which extends through the cylinder head 1.

Journalled in bearings 6 in the cylinder head is an overhead camshaft 7 which extends longitudinally of the cylinder head and directly over the inlet valves 3, the camshaft having thereon, for each pair of inlet and exhaust valves, an inlet valve cam 8 and an exhaust valve cam 9.

The inlet valve cam 8 engages a valve tappet 10 mounted on the upper end of the stem 11 of the inlet valve 3; and the exhaust valve cam 9 engages one end of a rocker lever 14 which, as shown is of pressed sheet metal construction and is pivotally mounted on a stud 15 which is secured in the cylinder head 1 at a point longitudinally aligned with and adjacent the inlet valve tappet. The stud 15 extends at an angle to the vertical and carries thereon a part spherical pivot member 16 the axial position of which on the stud 15 is adjustable by a lock nut 17 mounted on the end of the stud 15.

The other end 18 of the rocker lever 14 engages with the upper end of the stem 19 of the exhaust valve 4.

In operation, rotation of the camshaft 7 effects operation of the inlet valve 3 directly by means of the inlet valve cam 8 and the valve tappet 10; and effects operation of the exhaust valve indirectly by means of the exhaust valve cam 9 and rocker lever 14.

The inlet valves of an internal combustion engine normally require little or no adjustment of the tappet clearances between normal engine overhauls, whereas the exhaust valves normally require more frequent adjustment. For this reason, a valve gear according to the invention has advantages over known constructions because the inlet valves, which require less frequent adjustment, are operated directly by the cashaft 7 whereas the exhaust valves, which require more frequent adjustment, are actuated by the rocker levers 14, the clearance between which and the exhaust valve stem 19 and the exhaust valve cam 9 can be readily adjusted by means of the lock nut 17. The maintenance of the necessary clearances on the valves in a valve gear according to the invention is therefore a relatively simple matter.

The inclined position of the stud 15 also ensures that the forces exerted on the stud during actuation of the rocker lever are substantially parallel to its axis, so that the stress on the stud is correspondingly reduced. As is evident from FIG. 2 and FIG. 4, in order that the forces exerted on the stud be substantially parallel to its axis, the axis of the stud, the axis of the exhaust valve and of the pressure line of the rocker lever and exhaust valve cam substantially have a common point of intersection. In addition the inclination of the inlet and exhaust valves 3, 4 on opposite sides of a substantially medial vertical plane through the head permits the employment of a combustion chamber which is of substantially hemispherical shape as shown, or of "penthouse" shape, these shapes being generally regarded as more favourable to efficient combustion and enabling the valves 3, 4 to be of larger size than would be possible if the exhaust and inlet valves were in line with, and arranged below, a single camshaft. Moreover, as the engine inlet valves are normally larger and heavier than the exhaust valves the inertia of the inlet valve mechanism is reduced by the direct operation of the inlet valves as compared with arrangements in which the inlet valves are actuated by the use of rocker levers.

In the second embodiment of the invention shown in FIGURES 4 and 5, parts which are similar in function and construction to those in the first embodiment described with reference to FIGURES 1 to 3 bear reference numerals obtained by adding one hundred to the reference numeral of the part in the first embodiment.

FIGURES 4 and 5 show a combustion chamber 102 which has therein two inlet valves 103 and a single exhaust valve 104, there being accordingly two cams 108 acting directly on the tappets of the inlet valves 103, these cams being located one to each side of the single cam 109 actuating the rocker lever 114 the end 118 of which actuates the exhaust valve 104.

It will be noted that in this embodiment of the invention the axis of the exhaust valve 104 is vertical whereas the inlet valves 103 are each inclined at an angle to the vertical plane of symmetry through the cylinder head 101.

It will be understood however that the exhaust valve 104 in this embodiment could also be inclined at an angle to the vetrical if desired.

The arrangement shown in FIGURES 4 and 5 has the advantage that a high proportion of the available area in the combustion chamber can be used for the accommodation of the valves without unduly increasing the size of the valves; in addition better "breathing" of the combustible mixture is promoted with a corresponding increase in engine efficiency.

I claim:

1. In an internal combustion engine, a cylinder head having a plurality of combustion chambers arranged longitudinally thereof, each chamber having intake and exhaust ports opening therein, the intake ports being all arranged on one side of the cylinder head and the exhaust ports being all arranged on the other side, intake and exhaust valves for controlling the flow of gas through the ports, the axes of the intake valves being directed toward the longitudinal center of the chamber, each valve including a stem, a valve head carried by the stem and seated within the chamber and spring means biasing the valve in closing direction, a single camshaft mounted on the cylinder head directly over the inlet valve stems and having longitudinally spaced intake and exhaust cams, intake valve operating means comprising tappets reciprocable in the cylinder head and engaging the intake cams on one side and the intake valve stems on the other, and exhaust valve operating means longitudinally spaced between the intake valve operating means and each comprising a rocker arm, a rocker arm support including a stud having one end secured to the cylinder head at a point longitudinally aligned with and adjacent a corresponding intake tappet and an adjustable collar secured on the stud, the end of the collar adjacent the cylinder head forming a part-spherical central seat for the rocker arm, one end of the rocker arm being engaged with the exhaust cam and the other end being engaged with the exhaust valve stem, the axis of the stud, the axis of the exhaust valve and the pressure line of the rocker arm and exhaust valve cam being located in a common plane extending transversely of the cylinder head and having substantially a common point of intersection to avoid bending forces on the stud.

2. In an internal combustion engine, a cylinder head having a plurality of combustion chambers arranged longitudinally thereof, each chamber having intake and exhaust ports opening therein, the intake ports being all arranged on one side of the cylinder head and the exhaust ports being all arranged on the other side, intake and exhaust valves for controlling the flow of gas through the ports, the axes of the intake and exhaust valves being directed toward the longitudinal center of the chamber, each valve including a stem, a valve head carried by the stem and seated within the chamber and spring means biasing the valve in closing direction, a single camshaft mounted on the cylinder head directly over the inlet valve stems and having longitudinally spaced intake and exhaust cams, intake valve operating means comprising tappets reciprocable in the cylinder head and engaging the intake cams on one side and the intake valve stems on the other, and exhaust valve operating means longitudinally spaced between the intake valve operating means and each comprising a rocker arm, a rocker arm support including a stud having one end secured to the cylinder head at a point longitudinally aligned with and adjacent a corresponding intake tappet and an adjustable collar secured on the stud, the end of the collar adjacent the cylinder head forming a part-spherical central seat for the rocker ram, one end of the rocker arm being engaged with the exhaust cam and the other end being engaged with the exhaust valve stem, the axis of the stud, the axis of the exhaust valve and the pressure line of the rocker arm and exhaust valve cam being located in a common plane extending transversely of the cylinder head and having substantially a common point of intersection to avoid bending forces on the stud.

3. In an internal combustion engine, a cylinder head having a plurailty of combustion chambers arranged longitudinally thereof, each chamber having a pair of intake ports and a single exhaust port opening therein, the intake ports being all arranged on one side of the cylinder head and the exhaust ports being all arranged on the other side, intake and exhaust valves for controlling the flow of gas through the ports, the axes of the intake valves being directed toward the longitudinal center of the chamber, the axes of the exhaust valves being parallel to the chambers center lines, each valve including a stem, a valve head carried by the stem and seated within the chamber and spring means biasing the valve in closing direction, a single camshaft mounted on the cylinder head directly over the inlet valve stems and having longitudinally spaced intake and exhaust cams, intake valve operating means comprising tappets reciprocable in the cylinder head and engaging the intake cams on one side and the intake valve stems on the other, and exhaust valve operating means longitudinally spaced between the intake valve operating means and each comprising a rocker arm, a rocker arm support including a stud having one end secured to the cylinder head at a point longitudinally aligned with and adjacent a corresponding intake tappet and an adjustable collar secured on the stud, the end of the collar adjacent the cylinder head forming a part-spherical central seat for the rocker arm, one end of the rocker arm being engaged with the exhaust cam and the other end being engaged with the exhaust valve stem, the axis of the stud, the axis of the exhaust valve and the pressure line of the rocker arm and exhaust valve cam being located in a common plane extending transversely of the cylinder head and having substantially a common point of intersection to avoid bending forces on the stud.

References Cited by the Examiner
UNITED STATES PATENTS

| | | | |
|---|---|---|---|
| 1,271,764 | 7/1918 | Pullinger | 123—90 |
| 1,306,949 | 6/1919 | Coatalen | 123—90 |
| 1,609,149 | 11/1926 | Wilkinson | 123—90 |
| 1,915,237 | 6/1933 | Moore | 123—191 |
| 2,804,862 | 9/1957 | Nedwidek | 123—75 |
| 3,094,977 | 6/1963 | Sampietro | 123—90 |

FRED E. ENGELTHALER, *Primary Examiner.*

RICHARD B. WILKINSON, *Examiner.*